(12) United States Patent
Demarty et al.

(10) Patent No.: US 10,147,199 B2
(45) Date of Patent: Dec. 4, 2018

(54) METHOD AND APPARATUS FOR DETERMINING AN ORIENTATION OF A VIDEO

(71) Applicant: THOMSON LICENSING, Issy les Moulineaux (FR)

(72) Inventors: Claire-Helene Demarty, Montreuil le Gast (FR); Lionel Oisel, La Nouaye (FR); Patrick Perez, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 54 days.

(21) Appl. No.: 15/122,167

(22) PCT Filed: Feb. 23, 2015

(86) PCT No.: PCT/EP2015/053746
§ 371 (c)(1),
(2) Date: Aug. 27, 2016

(87) PCT Pub. No.: WO2015/128294
PCT Pub. Date: Sep. 3, 2015

(65) Prior Publication Data
US 2016/0371828 A1    Dec. 22, 2016

(30) Foreign Application Priority Data
Feb. 27, 2014    (EP) .................................... 14305275

(51) Int. Cl.
*G06T 7/70* (2017.01)
*G06T 7/20* (2017.01)
(52) U.S. Cl.
CPC .................. *G06T 7/70* (2017.01); *G06T 7/20* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS 5,487,172 A * 1/1996 Hyatt .................. B60R 16/0373
                                                      700/8
6,459,822 B1 * 10/2002 Hathaway ............. G06T 3/0006
                                                    345/649

(Continued)

FOREIGN PATENT DOCUMENTS

AU          9715901 A  *  6/2002

OTHER PUBLICATIONS

Bouthemy et al. A Unified Approach to Shot Change Detection and Camera Motion Characterization, IEEE Transactions on Circuits and Systems for Video Techology, vol. 9, No. 7, Oct. 1999.*

(Continued)

*Primary Examiner* — Jingge Wu
(74) *Attorney, Agent, or Firm* — Brian J. Dorini; Patricia A. Verlangieri

(57) ABSTRACT

A method and an apparatus for determining an orientation of a video are suggested. The method comprises the steps of: estimating a motion of the video; extracting translation-based parameters from the estimated motion of the video; and computing at least one feature giving the evolution of the horizontal translation over time against the evolution of the vertical translation according to the translation based parameters, the feature being used for determining the orientation of the video.

22 Claims, 6 Drawing Sheets

(56) References Cited

U.S. PATENT DOCUMENTS

| | | | |
|---|---|---|---|
| 8,335,350 B2 | 12/2012 | Wu | |
| 8,708,494 B1* | 4/2014 | Surkov | G09G 5/377 351/159.75 |
| 2005/0058337 A1 | 3/2005 | Fujimura et al. | |
| 2008/0031490 A1* | 2/2008 | Kobayashi | G06K 9/3258 382/101 |
| 2009/0279741 A1* | 11/2009 | Susca | G06T 7/246 382/107 |
| 2011/0228112 A1* | 9/2011 | Kaheel | H04N 1/00127 348/208.4 |
| 2012/0213493 A1* | 8/2012 | Luo | G06F 17/30056 386/248 |
| 2012/0213497 A1* | 8/2012 | Lou | G11B 27/00 386/343 |
| 2012/0230429 A1 | 9/2012 | Boyce et al. | |
| 2012/0308114 A1* | 12/2012 | Othmezouri | G05D 1/0251 382/154 |
| 2013/0201291 A1* | 8/2013 | Liu | G06F 3/012 348/47 |
| 2013/0272581 A1 | 10/2013 | Moden | |
| 2013/0322698 A1* | 12/2013 | Moden | G06T 7/2033 382/107 |
| 2014/0267431 A1* | 9/2014 | Sheynblat | G06F 1/1626 345/659 |

OTHER PUBLICATIONS

Bouthemy P et al: "A Unfied Approach to Shot Change Detection and Camera Moti on Characterization",IEEE Transactions on Circuits and Systems for Video Technology, IEEE Service Center,Piscataway, NJ, US,vol. 9, No. 7, Oct. 1, 1999 (Oct. 1, 1999), pp. 1030-1044.

Sharma et al., "Categorization and Orientation of Consumer Images", Third International Conference on Pattern Recognition and Machine Intelligence, New Delhi, India, Dec. 16, 2009, pp. 495-500.

Cingovska et al., "Automatic Image Orientation Detection with Prior Hierarchical Content-Based Classification", 2011 18th IEEE International Conference on Image Processing, Brussels, Belgium, Sep. 11, 2011, pp. 2985-2988.

Luo et al., "Automatic Image Orientation Detection via Confidence-Based Integration of Low-Level and Semantic Cues", IEEE Transactions on Pattern Analysis and Machine Intelligence, vol. 27, No. 5, May 2005, pp. 715-726.

Odobez et al., "Robust Multiresolution Estimation of Parametric Motion Models", Journal of Visual Communication and Image Representation, vol. 6, No. 4, Dec. 1995, pp. 348-365.

* cited by examiner

Landscape: 0°   Counter-clockwise camera rotation   Portrait: -90°

Portrait: 90°   Counter-clockwise camera rotation   Landscape: 0°

Portrait: 90°   Counter-clockwise camera rotation   Landscape: 180°

Landscape: 180°   Counter-clockwise camera rotation   Portrait: -90°

METHOD AND APPARATUS FOR DETERMINING AN ORIENTATION OF A VIDEO

This application claims the benefit, under 35 U.S.C. § 365 of International Application of PCT/EP2015/053746, filed Feb. 23, 2015, which was published in accordance with PCT Article 21(2) on Sep. 3, 2015, in English, and which claims the benefit of European patent application No. 14305275.1, filed Feb. 27, 2014.

TECHNICAL FIELD

The present disclosure generally relates to image processing. In particular, the present disclosure relates to a method and an apparatus for determining an orientation of a video.

BACKGROUND

In some applications of the computer processing of video content, there is a need to estimate the orientation of a given video. For example, a context of such applications is that when a person wants to browse and watch a video, it is necessary to have the correct orientation of the video for a correct display of the video. Another context is in the computer vision processing, such as face detection, specific object detection and recognition, sky regions detection and more general semantic video parsing. As an initial requirement in this case, the images and videos to be processed are supposed to be proposed with correct orientations. Therefore, the determination of the orientation of a video might be applied as a first and essential preprocessing for such computer vision processing.

One known solution to get the correct orientation of a video needs to use additional metadata stored with the video content during the capture of the video. For example, such additional metadata can be from the metadata tags defined in the Exif (Exchangeable image file format) standard. The orientation knowledge relies on the gyro info. In this case, the presence of such metadata will depend on the capture devices used. However, such information is normally not available for low-cost devices. Certain mobile phones, e.g., iphones, do not have such information, whereas low cost smart phones will not store the information. Furthermore, in case of a video, the orientation information is computed only based on the first image of the video, and will not change in case of a rotation during the capture. With this known solution, the orientation information may therefore be true only for the first part of the video.

Another known solution is called an automatic system. The following documents relate to such automatic system which can automatically detect the orientation of a still image:

[1] Cingovska, I.; Ivanovski, Z.; Martin, F., Automatic image orientation detection with prior hierarchical content-based classification, Image Processing (ICIP), 2011 18th IEEE International Conference on, vol., no., pp. 2985,2988, 11-14 Sep. 2011
[2] G. Sharma, A. Dhall, S. Chaudhury and R. Bhatt, Hierarchical System for Content Based Categorization and Orientation of Consumer Images, Pattern Recognition and Machine Intelligence, vol 5909, p 495-500, 2009.
[3] Jiebo Luo; Boutell, M., Automatic image orientation detection via confidence-based integration of low-level and semantic cues, Pattern Analysis and Machine Intelligence, IEEE Transactions on, vol. 27, no. 5, pp. 715,726, May 2005

However, as mentioned above, it seems that the objective of the above three documents is to detect the orientation for still images since no references of systems processing videos were discussed. The proposed systems for still images are usually based on the extraction of features from the image and the use of some machine learning techniques. This implies that a first step of training of a model is needed on a database of annotated images, which may result in a costly off-line processing. The best performing system also uses different features extracted from the video content, ranging from color or texture-related low-level features (first color moments, Edge Direction Histograms, etc.) to higher-level semantic information (face detection, sky detection, lines detection, etc.), which takes most of the time of the system and leads to a heavy computation load. Such processing on still images could be applied on a frame by frame basis on each frame of the video, or on a subsampling of these frames. However, the consequence is that the processing becomes even more expensive from the computation point of view.

Therefore, there is a need to detect, with a reasonable computation load, the correct orientation of a given video, and at the same time to ensure that the detected orientation is correct for each frame of the video (it assumes that the device for capturing the video may be rotated during the capture phase).

SUMMARY

In view of the above problem in the conventional technologies, the disclosure provides a method and an apparatus for determining an orientation of a video with reasonable computation load for each orientation-homogeneous part of the video.

According to the disclosure, some features are extracted based on the estimated motion (dominant or object-based) of the video scene. From these motion-based features, some frame-based orientation information is computed together with potential changes in orientation. Together with the temporal orientation information, the disclosure also results in an associated segmentation into orientation-homogeneous parts of the video.

According to a first embodiment of the disclosure, a method for determining an orientation of a video is provided. The method comprises the steps of: estimating a motion of the video; extracting translation-based parameters from the estimated motion of the video; and computing at least one feature giving the evolution of the horizontal translation over time against the evolution of the vertical translation according to the translation based parameters, the feature being used for determining the orientation of the video.

In the first embodiment, the method further comprises: extracting rotation-based parameters from the estimated motion of the video; splitting the video into at least one segment separated by the rotations detected according to the rotation-based parameters; and determining the orientation of the video as a function of an integration of said at least one feature over each of said at least one segment.

According to a second embodiment of the disclosure, an apparatus for determining an orientation of a video is provided. The apparatus comprises a processor configured to: estimating a motion of the video; extracting translation-based parameters from the estimated motion of the video; and computing at least one feature giving the evolution of the horizontal translation over time against the evolution of the vertical translation according to the translation based parameters, the feature being used for determining the orientation of the video.

According to a third embodiment of the disclosure, a computer program product downloadable from a communication network and/or recorded on a medium readable by computer and/or executable by a processor is provided. The computer program product comprises program code instructions for implementing the steps of the method according to one aspect of the disclosure.

According to a fourth embodiment of the disclosure, a Non-transitory computer-readable medium comprising a computer program product recorded thereon and capable of being run by a processor is provided. The Non-transitory computer-readable medium includes program code instructions for implementing the steps of a method according to one aspect of the disclosure.

It is to be understood that more aspects and advantages of the disclosure will be found in the following detailed description of the present disclosure.

BRIEF DESCRIPTION OF THE DRAWINGS

The accompanying drawings are included to provide further understanding of the embodiments of the disclosure together with the description which serves to explain the principle of the embodiments. The disclosure is not limited to the embodiments.

In the drawings.

DETAILED DESCRIPTION

An embodiment of the present disclosure will now be described in detail in conjunction with the drawings. In the following description, some detailed descriptions of known functions and configurations may be omitted for conciseness.

An embodiment of the disclosure provides a method for determining an orientation of a video. Next, the method of the embodiment of the present disclosure will be described in details.

Figure 1:
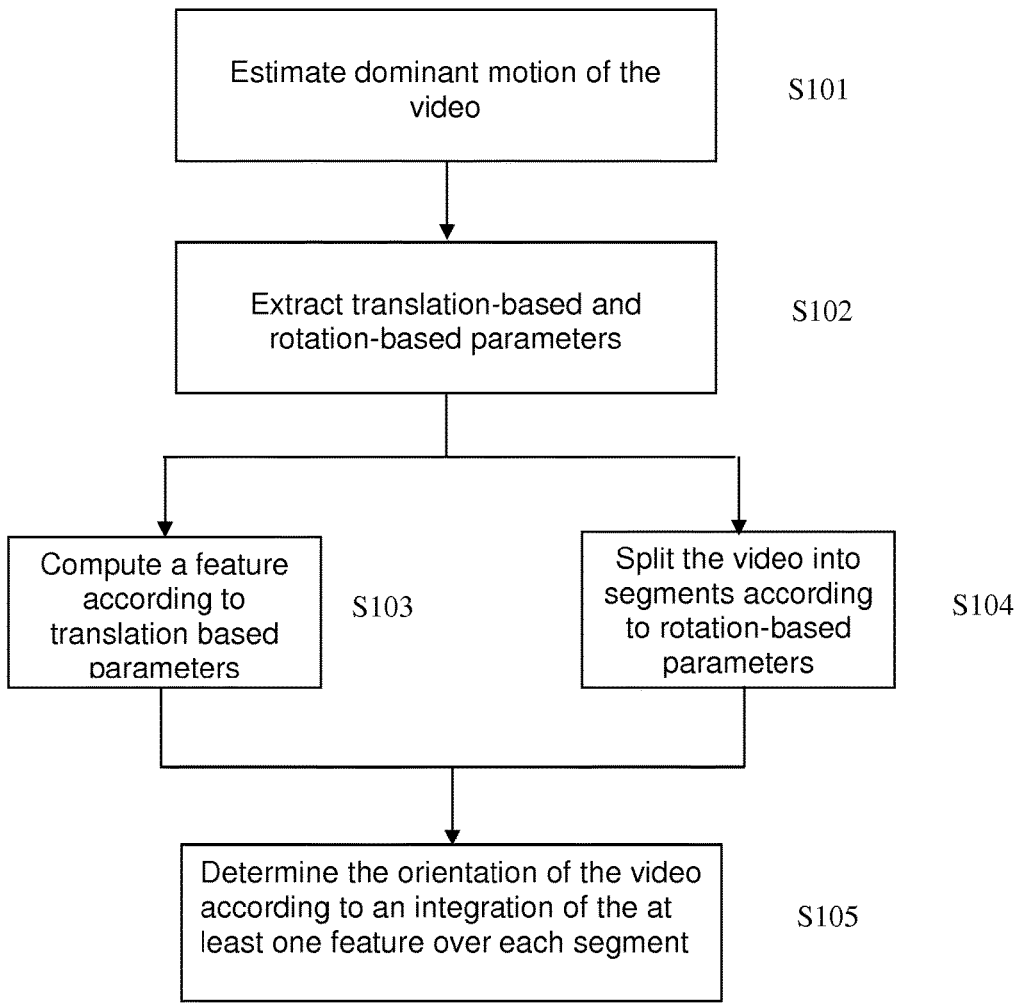
FIG. 1 is a flow chart showing a method for determining an orientation of a video according to an embodiment of the disclosure.

FIG. 1 is a flow chart showing a method for determining an orientation of a video according to an embodiment of the disclosure.

For simplicity, embodiments of the disclosure will be discussed with only distinguishing between 4 orientations of 0°, 90°, −90° and 180° for each frame of the video, i.e. between the two landscape (0°, 180°) and portrait (90°, −90°) orientations. The present disclosure therefore will only discuss a classification of the frames into these 4 classes and no further precise orientation angle will be extracted. Furthermore, in some embodiments of the disclosure, the system will provide a first classification into portrait/landscape without distinguishing between the two possible portrait orientations (90°, −90°) and between the two possible landscape orientations (0°, 180°). However, it can be appreciated that the disclosure can also be applied to the cases with more complicated orientation classification.

As shown in FIG. 1, at step S101, it estimates motion of the video. It should be noted that a dominant motion of the video is preferred for the motion estimation in the step S101. But some object-based motion estimation may be relied on when no dominant motion in the video is to be estimated. The dominant motion estimation can be carried out by computing, at each instant, a parametric approximation of the dominant motion of the video. Some known solutions can be used for the estimation of dominant motion. For example, the following document disclosed a start-of-the-art technology for this purpose:

[4] J. M. Odobez, P. Bouthemy, Robust multiresolution estimation of parametric motion models. Journal of Visual Communication and Image Representation, 6(4):348-365, December 1995.

Next, at step S102, it extracts translation-based parameters and rotation-based parameters from the estimated dominant motion of the video.

Motion estimators output the estimated motion model from which an estimation of the translations in both horizontal and vertical directions together with an estimation of the rotation can be extracted.

It can be appreciated that a motion model can be accessed from the dominant motion estimation, which may contain parameters depending on the motion to be estimated. In this embodiment, an affine model with 6 parameters can be considered as the matrix below:

$$\begin{matrix} a0 & a1 & a2 \\ b0 & b1 & b2 \end{matrix}$$

In the above model, for example, the first two parameters a0 and b0 respectively correspond to Tx and Ty, the translation values in the x axis and y axis. The four remaining parameters provide information on the rotation and zooming motions. By considering the value of a2−b1, a quantity proportional to the sinus of the applied rotation can be accessed.

In this step, optionally the translation-based parameters and rotation-based parameters can be integrated over a certain period of time. For the integration, the trapezoidal rule, which is a well-known technique for approximating the definite integral, can be applied on a given window. In this embodiment, the size of the given window can be empirically fixed to, for example, 20 frames. But this size can be adapted according to the context. From the dominant motion estimation, only small translation and rotation values can be accessed from one frame to another. From these values it is difficult to accurately detect rotations and translations. The advantage of the integration is to provide a larger view of the motion on a longer period of time.

Next, at step S103, it computes at least one feature giving the evolution of the horizontal translation over time against the evolution of the vertical translation according to the translation based parameters. Such a feature can give some clue about whether the video was captured in a portrait or landscape mode. In most of the cases, when the amplitude of the translational component of dominant motion is substantially larger in the horizontal direction than in the vertical one, it is likely that the video was captured in landscape mode, as more panning user than tilting will tend to be used during the capturing of a scene of the video.

The analysis of the feature below will for example give the requested information:

Featuretrans (frame)=abs($tx$(frame))−abs($ty$(frame))

Figure 2:
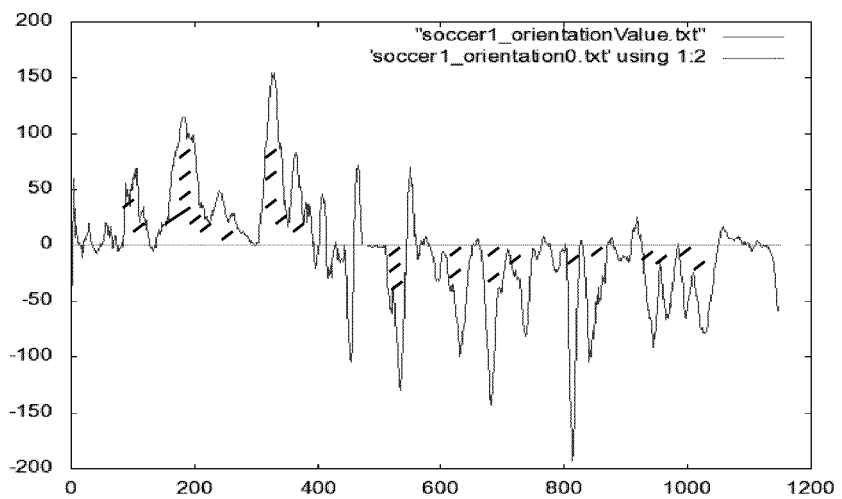
FIG. 2 is a diagram showing an evolution of the difference of the absolute horizontal and vertical translations over time, while integrated.

FIG. 2 shows an example of evolution of such a feature over time from integrated values of Tx and Ty. Positive values tend to indicate a landscape orientation of the video, while negative values tend to indicate a portrait orientation of the video. In an optional step the above feature may be smoothed over a given sliding time window to improve the accuracy of the analysis.

At step S104 in parallel to the step S103, it splits the video into segments separated by the rotations detected according to the rotation-based parameters, whether integrated or not.

It can be appreciated that the rotation-based parameter will in turn give some information on whether the camera was rotated during the capture. The segmentation can be carried out through a thresholding of the extracted rotation-based parameters.

Figure 3:
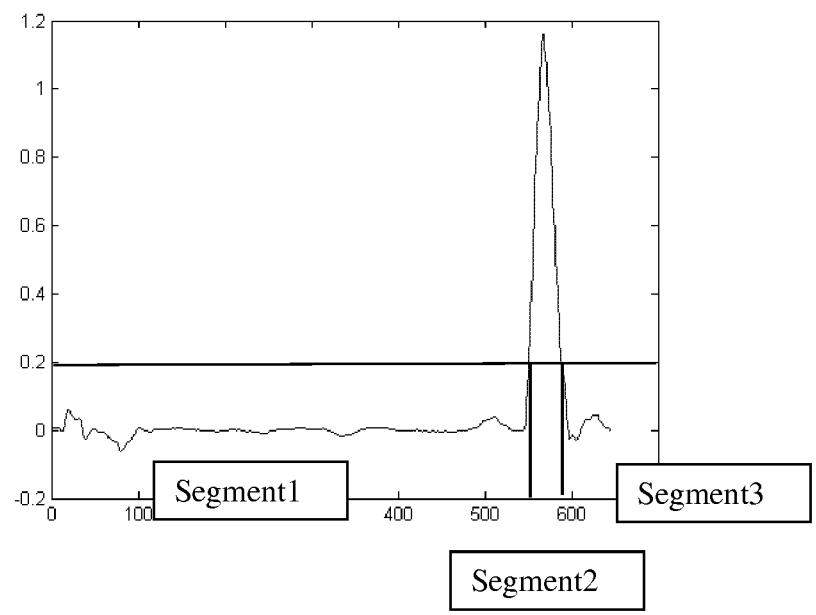
FIG. 3 is a diagram showing an example of the evolution of the rotation parameter, while integrated.

FIG. 3 is a diagram showing an example of the evolution of the rotation-based parameters after integration. In this case, the thresholding will give three segments: segment 1 before the rotation, segment 3 after the rotation and segment 2 which corresponds to the rotation and for which the system will not give any orientation information in the embodiment. FIG. 3 illustrates an example of splitting the video wherein a simple threshold is applied. Regions above the threshold correspond to clockwise rotations, regions below the opposite of the threshold correspond to counterclockwise rotations, and regions therebetween correspond to regions without rotations. In this example the threshold value was fixed to an empirical value of 0.2. But more adaptive can be made according to the video content, for example, something that will only keep values below mean-2sigma. Optionally, a refinement can be added in the detection of the rotation boundaries. This refinement will start with a higher threshold that gives markers of potential rotations. Then it goes temporally backward in order to find the rotation start which corresponds to the frame for which the absolute value of the rotation parameter is very low (ie. lower than epsilon value). Next it searches forward for the end of the rotation, which corresponds to the first frame for which the absolute value of the rotation parameter is lower than epsilon.

At step S105, it determines the orientation of the video according to an integration of the at least one feature obtained in the step S103 over each segment obtained by the step S104.

The orientation of the video is determined by computing the orientation of each segment before and after rotations by integrating Featuretrans, for all frames of the segment, in order to get one representative single value of Featuretrans per segment. In this embodiment, it can simply be the computation of the area below the curve in FIG. 2 (see hatched regions) over the segments. In another embodiment, an additional threshold T is used on the translation-based parameter. The number of continuous parts in which Featuretrans>T and Featuretrans<−T is counted, plus the duration of these parts. A simple normalized sum of these two counters will provide a new 'integrated' value of Featuretrans.

If no rotation is detected, an integrated value of Featuretrans over the whole video or over windows of a predefined size is computed. Specifically, if no rotation was detected, then there is only one big segment in the whole video. In this case, the same integration process for Featuretrans can be simply applied as what is done to the segment, which however is done to the whole video. As a variant, if the video is very long, then it can be processed window by window. In this case, the integration will be done once again but over a predefined window size.

In this embodiment, the orientation of each segment will then be given by:

If Featuretrans_integrated_over_segment>0, then orientation is landscape.

If Featuretrans_integrated_over_segment<0, then orientation is portrait.

As described above, for simplicity, the embodiments of the disclosure is discussed with only distinguishing between a limited number of orientations. In an additional refinement of the disclosure, some additional processing, such as for example face detection, can be applied to distinguish further between the two portrait or the two landscape orientations. It can be appreciated by a person skilled in the art that, by detecting faces in pictures, some information of the most likely orientation of a picture can be obtained, as it is very unlikely that people and therefore faces will be upside down. It is also quite unlikely to have people and therefore faces lying in images than people standing. Such information can be used to further distinguish orientations of a video. No further details will be given in this respect.

Figure 4:
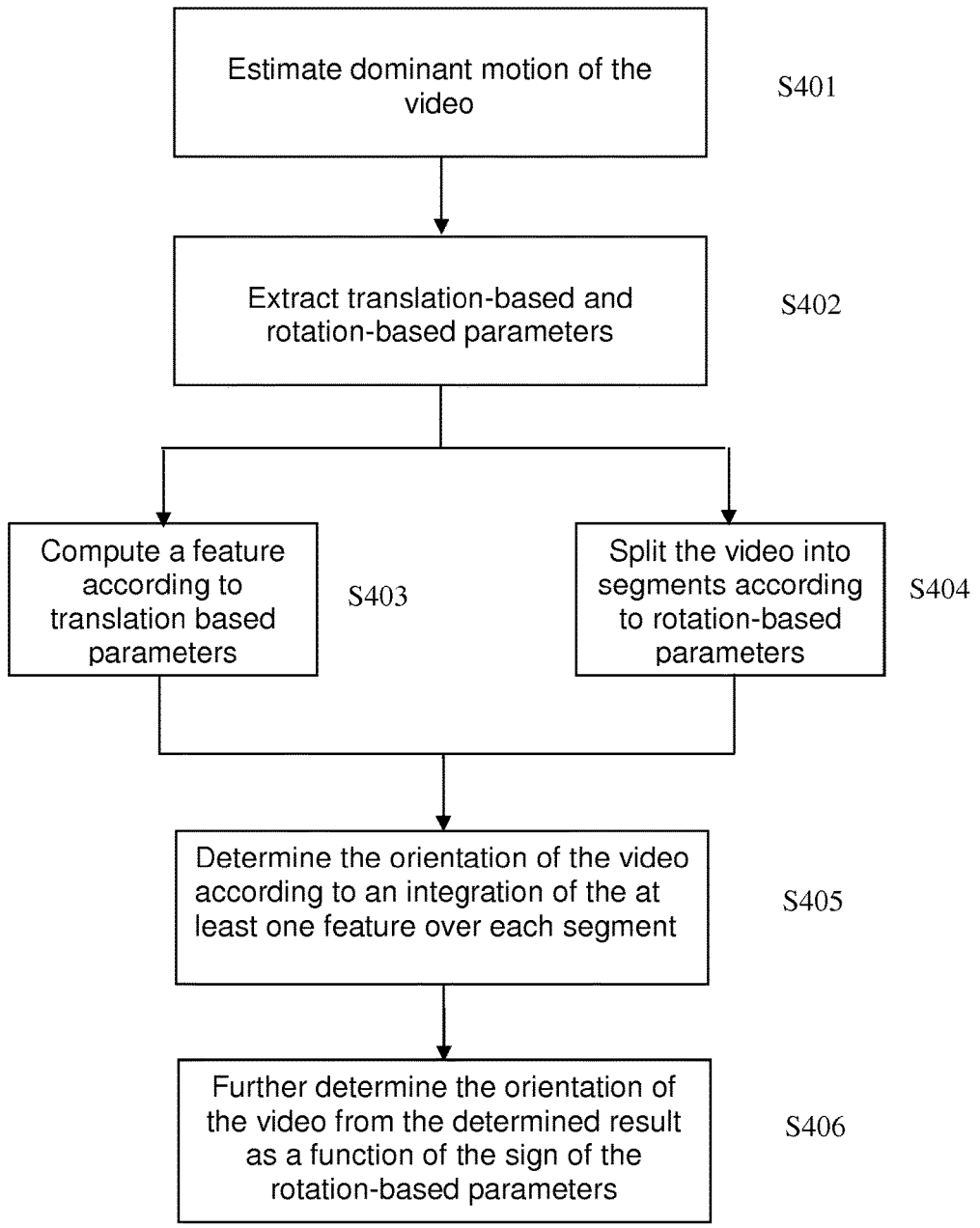
FIG. 4 is a flow chart showing a method for determining an orientation of a video according to another embodiment of the disclosure.

FIG. 4 is a flow chart showing a method for determining an orientation of a video according to another embodiment of the disclosure.

In the embodiment shown in FIG. 4, steps S401-S405 are respectively identical to steps S101-S105 in FIG. 1. A further step S406 is added, which further distinguishes the orientation of the video obtained in the step S405 according to the angle of rotation (for example this angle can be extracted from the rotation-based parameter extracted in the step S402). In the context of the embodiment described with reference to FIG. 1, the added step S406 can help distinguishing between the two portraits and the two landscape orientations determined in the step S405.

From step S404, information about whether a rotation took place in the video or not can be obtained (the absolute value of the rotation parameter is above a given threshold). Depending on the sign of the rotation parameter obtained in step S402, information on the direction of the rotation can be accessed (if rotation_parameter>0, then the scene rotates clock-wise, i.e. the camera was turned counter-clock-wise, relatively to the center of the frame, if rotation_parameter<0, then the scene rotates counter-clock-wise, i.e. the camera was turned clock-wise, relatively to the center of the frame). The final rotation value for the video that corresponds to the rotation may either be an integrated value of the rotation parameter over the segment, or simply: −/+max_over_segment(abs(rotation_parameter). The sign of this quantity will depend on the sign of the rotation_parameter over current segment.

In the following description, only the simpler case where frames may only belong to the three classes 0°, 90, −90° is considered. It can be appreciated that a video with an upside down orientation is very rare, which therefore will not be considered in the following description. In a refinement of the disclosure, the 180° orientation class may be added by following a similar reasoning.

Table 1 below shows the information on the orientation for segments before and after the rotation according to the estimated rotation parameter (epsilon1>0).

TABLE 1

| | Rotation parameter | | |
|---|---|---|---|
| | Case 1: \|rot_param\| < epsilon1 | Case 2: rot_param < -epsilon1 Camera was turned clock-wise | Case 3: rot_param > epsilon1 Camera was turned counter-clock-wise |
| Orientation | No information | A = (orient_before = 0 and orient_after = 90) or B = (orient_before = -90 and orient_after = 0) | C = (orient_before = 0 and orient_after = -90) or D = (orient_before = 90 and orient_after = 0) |

In the Table 1, orient_before and orient_after mean respectively the orientation of all frames before the rotation and the orientation of all frames after the rotation. A rotation parameter is studied in each column. Depending on the sign and value of a parameter, some insight can be obtained on both the fact that a rotation takes place and in this case, in which direction the rotation is taken: clock wise, counter clock wise.

Figure 5:
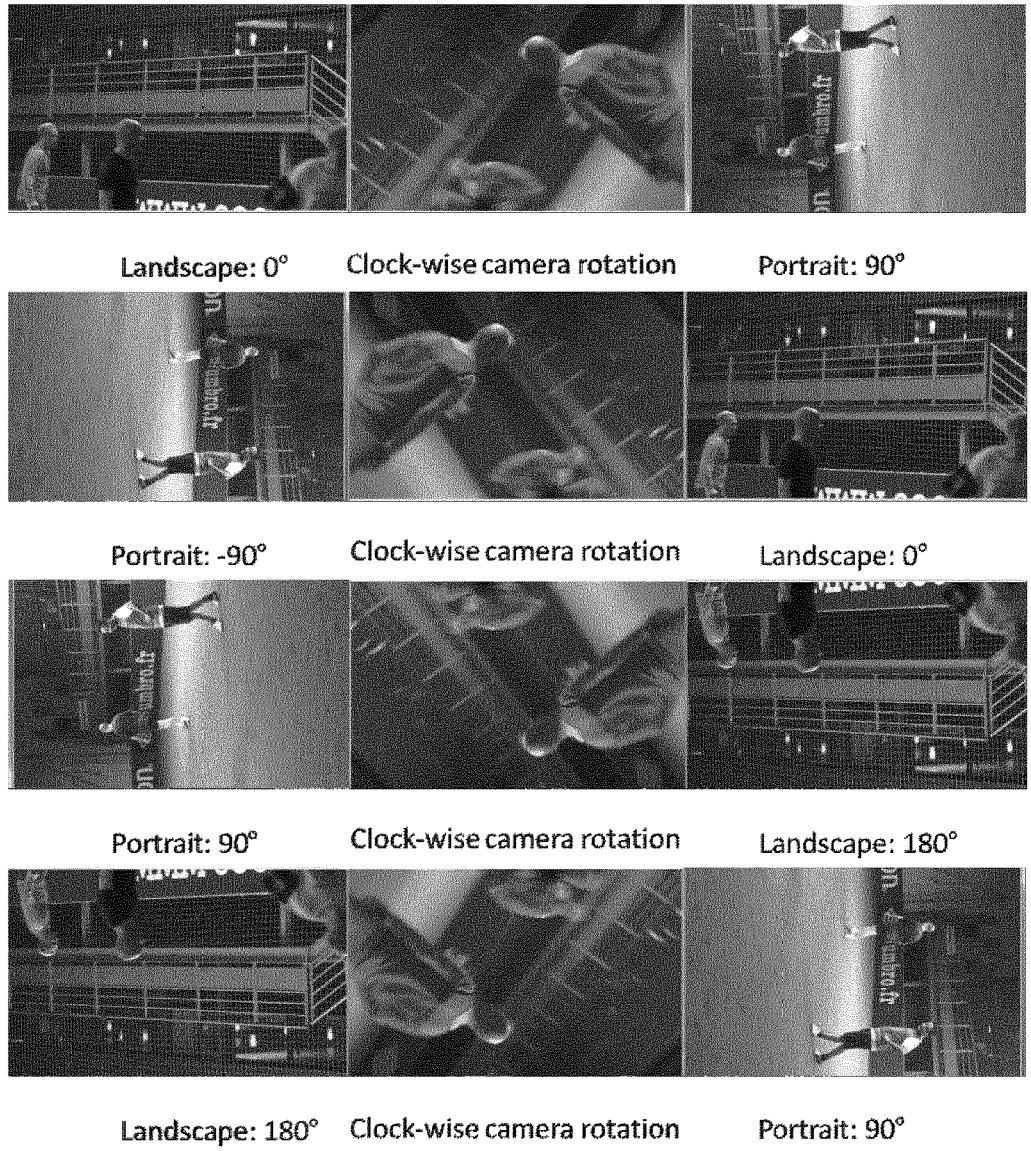
FIG. 5 is an exemplary diagram showing different possible orientations before and after a clock-wise camera rotation (Case 2 in Table 1)
Figure 6:
FIG. 6 is an exemplary diagram showing different possible orientations before and after a counter-clock-wise camera rotation (Case 3 in Table 1)
Figure 6:
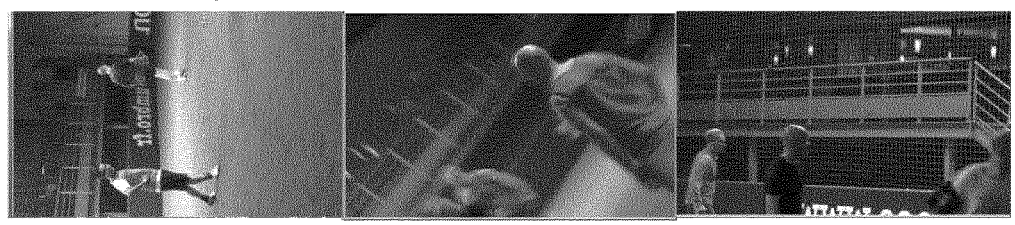
Figure 6:
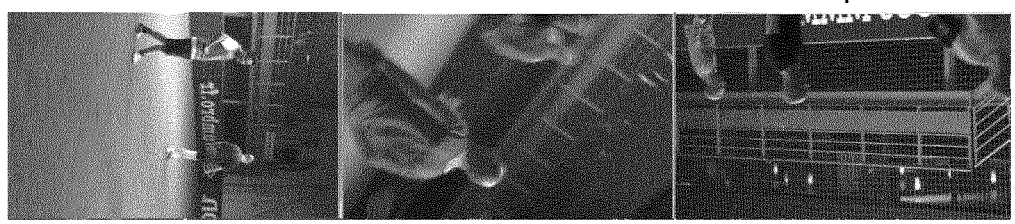
Figure 6:
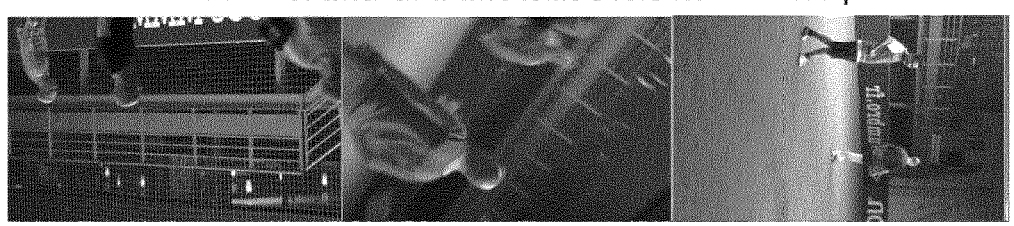

FIGS. 5 and 6 illustrate different cases discussed in the Table 1. From FIGS. 5 and 6 and from the rotation direction, there are only a few possibilities for the translation values before and after the rotation.

FIG. 5 is an exemplary diagram showing different possible orientations before and after a clock-wise camera rotation (Case 2 in Table 1). Only the first two cases are considered in the following description. FIG. 6 is an exemplary diagram showing different possible orientations before and after a counter-clock-wise camera rotation (Case 3 in Table 1). Similarly, only the first two cases are considered in the following description.

To further solve the ambiguity between situations A and B, or C and D in the Table 1, integrated values of the translation feature before and after the rotation, computed as described in step S405, if any, are compared and mixed according to the following Table 2 to obtain, depending on the cases, zero, one or two possible orientations of frames before and after the rotation.

Table 2 shows the orientation decisions according to translation and rotation parameters/features. Cases 1, 2, 3 are described in Table 1 (epsilon2 is positive).

For some cases where FeaturetransIntegrated or rotation values are too small, some rejection policy is applied: no orientation information is output. In a variant of the disclosure, undefined cases (several possible orientations) may be converted into rejected cases.

In addition, if the translation parameters before and after rotation both agree to classify segments before and after rotations as portrait segments for example, it is possible that the rotation was erroneously detected. In this case, the addition of the step S406 can help remove this false alarm. Choosing one or the other between these two on-going procedures may depend on a confidence value we may have on both the rotation parameter and the translation parameter.

If several rotations are detected in a video, similar rules such as the ones described in the Table 2 can be derived and propagated along the video to solve undefined cases.

Advantageously, when no translation is detected from the dominant motion estimation, the motion of some objects in the scene can be estimated and some translation information of these objects, if any, can be used instead of that of the dominant motion.

In case camera and objects are moving, a schema integrating translation information of both areas can be used. Nevertheless, for the segmentation into homogeneous orientation video segments, the dominant rotation remains the only reliable criterion.

To enlarge the robustness of the method, if the computation load permits, some additional features used in static pictures can be used as well. For example, the face orientation remains an interesting cue to be merged with the motion-based feature proposed in this disclosure.

The disclosure advantageously offers the orientation information for all frames of a given video, even when a rotation occurs during the capture. It is based on some light motion-based processing applied on the video and hence does not need an off-line learning process. The step of

TABLE 2

| | | Before_rot | | | | | |
|---|---|---|---|---|---|---|---|
| After_rot | | \|Feature$_{trans}$Integrated\| < epsilon2 | | Feature$_{trans}$Integrated > epsilon2 | | Feature$_{trans}$Integrated < -epsilon2 | |
| \|Feature$_{trans}$Integrated\| < epsilon2 | Case 1 | rejection | Case 1 | orientation = 0 | Case 1 | orientation = 90 or -90 | |
| | Case 2 | A or B | Case 2 | A | Case 2 | B | |
| | Case 3 | C or D | Case 3 | C | Case 3 | D | |
| Feature$_{trans}$Integrated > epsilon2 | Case 1 | orientation = 0 | Case 1 | orientation = 0 | Case 1 | rejection | |
| | Case 2 | B | Case 2 | A or B | Case 2 | B | |
| | Case 3 | D | Case 3 | C or D | Case 3 | D | |
| Feature$_{trans}$Integrated < -epsilon2 | Case 1 | orientation = 90 or -90 | Case 1 | rejection | Case 1 | orientation = 90 or -90 | |
| | Case 2 | A | Case 2 | A | Case 2 | A or B | |
| | Case 3 | C | Case 3 | C | Case 3 | C or D | | motion estimation can be realized in real time and the on-line orientation detection process is applied instantaneously after the motion estimation either over the whole video, or over some predefined time windows.

The disclosure can be implemented on a video player which for example provides playback of previously captured videos. The video player comprises but is not limited videolan on PC, online video websites and smart phones.

An embodiment of the disclosure provides a corresponding apparatus for determining an orientation of a video.

Figure 7:
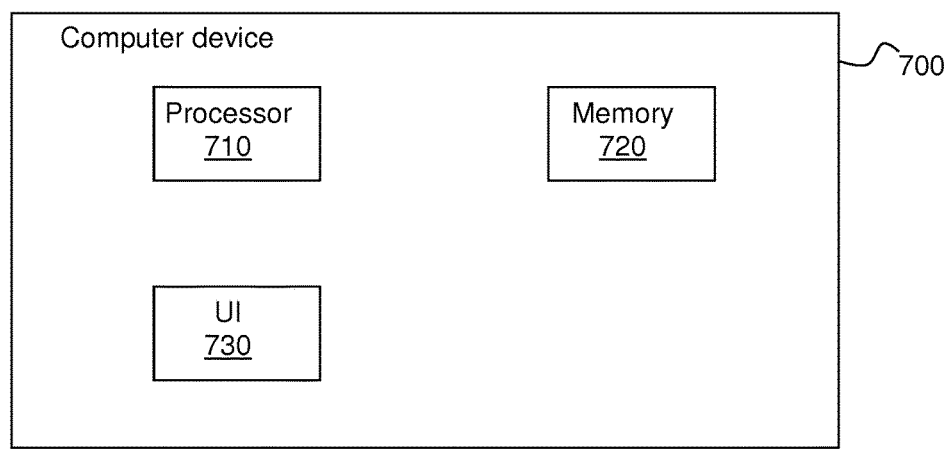
FIG. 7 is block diagram showing a computer device on which the method for determining an orientation of a video according to an embodiment of the disclosure may be implemented.

FIG. 7 is block diagram showing a computer device 700 on which the method for determining an orientation of a video according to an embodiment of the disclosure may be implemented. The computer device 700 can be any kind of suitable computer or device capable of performing calculations, such as a standard Personal Computer (PC). The device 700 comprises at least one processor 710, RAM memory 720 and a user interface 730 for interacting with a user. The skilled person will appreciate that the illustrated computer is very simplified for reasons of clarity and that a real computer in addition would comprise features such as network connections and persistent storage devices.

With the user interface 730, a user can input/select a video for playback. The result of the determined orientation of the video can also be outputted, if needed, to the user by the user interface 730.

The processor 710 comprises a first unit for estimating a motion of the video.

The processor 710 further comprises a second unit for extracting translation-based parameters and rotation-based parameters from the estimated motion of the video.

The processor 710 further comprises a third unit for computing at least one feature giving the evolution of the horizontal translation over time against the evolution of the vertical translation according to the translation based parameters.

The processor 710 further comprises a fourth unit for splitting the video into segments separated by the rotations detected according to the rotation-based parameters.

The processor 710 further comprises a fifth unit for determining the orientation of the video as a function of an integration of said at least one feature over each of said segments.

An embodiment of the disclosure provides a computer program product downloadable from a communication network and/or recorded on a medium readable by computer and/or executable by a processor, comprising program code instructions for implementing the steps of the method described above.

An embodiment of the disclosure provides a non-transitory computer-readable medium comprising a computer program product recorded thereon and capable of being run by a processor, including program code instructions for implementing the steps of a method described above.

It is to be understood that the present disclosure may be implemented in various forms of hardware, software, firmware, special purpose processors, or a combination thereof. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present disclosure is programmed. Given the teachings herein, one of ordinary skill in the related art will be able to contemplate these and similar implementations or configurations of the present disclosure.

The invention claimed is:

1. A method for presenting video frames of a video, each video frame relates to one of a landscape (0°, 180°) orientation and a portrait orientation (90°, −90°), comprising:
    extracting translation-based parameters including a horizontal translation and a vertical translation from an estimated motion of the video frames;
    computing at least one feature representing an integrated value of the horizontal translation and the vertical translation over a time period, wherein when the integrated value is positive, it is the landscape (0°, 180°) orientation; when the integrated value is negative, it is the portrait orientation (90°, −90°); and
    presenting the video frames within the time period in an orientation based on said at least one feature.

2. The method according to claim 1, further comprising:
    extracting rotation-based parameters from the estimated motion of the video;
    splitting the video into at least one segment separated by the rotations detected according to the rotation-based parameters; and
    determining the orientation of the video as a function of an integration of said at least one feature over each of said at least one segment.

3. The method according to claim 1, wherein the estimation comprise estimating a dominant motion of the video.

4. The method according to claim 1, wherein the estimation comprises computing, at each instant, a parametric approximation of the motion of the video.

5. The method according to claim 2, wherein the splitting comprises a thresholding of the extracted rotation-based parameters.

6. The method according to claim 2, wherein the determination comprises computing the orientation of each segment before and after rotations by integrating said at least one feature for all frames of the segment to get one representative single value of said at least one feature per segment.

7. The method according to claim 1, further comprising smoothing said at least one feature over a sliding time window.

8. The method according to claim 2, further comprising:
    determining the orientation of the video frames from the determined result according to the rotation angle of said rotation-based parameters.

9. The method according to claim 8, wherein the rotation angle is determined according to the sinus of the rotation-based parameters.

10. The method according to claim 8, wherein the landscape (0°, 180°) orientation further includes a 0° landscape orientation and a 180° landscape orientation, and a portrait orientation (90°, −90°) further includes a 90° portrait orientation and a −90° portrait orientation.

11. An apparatus for presenting video frames of a video, each video frame relates to one of a landscape (0°, 180°) orientation and a portrait orientation (90°, −90°), comprising a processor configured to:
  extract translation-based parameters including a horizontal translation and a vertical translation from an estimated motion of the video frames;
  compute at least one feature representing an integrated value of the horizontal translation and the vertical translation over a time period, wherein when the integrated value is positive, it is the landscape (0°, 180°) orientation; when the integrated value is negative, it is the portrait orientation (90°, −90°); and
  present the video frames within the time period in an orientation based on said at least one feature.

12. A computer program product recorded on a non-transitory medium readable by computer and executable by a processor, comprising program code instructions for implementing the method according to claim 1.

13. A non-transitory computer-readable medium comprising a computer program product recorded thereon and capable of being run by a processor, including program code instructions for implementing the method according to claim 1.

14. The apparatus according to claim 11, wherein the processor is further configured to:
  extract rotation-based parameters from the estimated motion of the video;
  split the video into at least one segment separated by the rotations detected according to the rotation-based parameters; and
  determine the orientation of the video as a function of an integration of said at least one feature over each of said at least one segment.

15. The apparatus according to claim 11, wherein the estimation comprises estimating a dominant motion of the video.

16. The apparatus according to claim 11, wherein the estimation comprises computing, at each instant, a parametric approximation of the motion of the video.

17. The apparatus according to claim 14, wherein the splitting comprises a thresholding of the extracted rotation-based parameters.

18. The apparatus according to claim 14, wherein the determination comprises computing the orientation of each segment before and after rotations by integrating said at least one feature for all frames of the segment to get one representative single value of said at least one feature per segment.

19. The apparatus according to claim 11, wherein the processor is further configured to smooth said at least one feature over a sliding time window.

20. The apparatus according to claim 11, wherein the processor is further configured to determine the orientation of the video frames from the determined result according to the rotation angle of said rotation-based parameters.

21. The apparatus according to claim 20, wherein the rotation angle is determined according to the sinus of the rotation-based parameters.

22. The apparatus according to claim 20, wherein the landscape (0°, 180°) orientation further includes a 0° landscape orientation and a 180° landscape orientation, and a portrait orientation (90°, −90°) further includes a 90° portrait orientation and a −90° portrait orientation.

* * * * *